United States Patent [19]

Shaw et al.

[11] Patent Number: 4,753,029
[45] Date of Patent: Jun. 28, 1988

[54] BOAT FISHING POLE AND LINE HOLDER

[76] Inventors: James L. Shaw; Sarah J. Shaw, both of 997 Carolton, Memphis, Tenn. 38127

[21] Appl. No.: 81,677
[22] Filed: Aug. 5, 1987
[51] Int. Cl.$^4$ ............................................. A01K 97/10
[52] U.S. Cl. ...................................... 43/21.2; 248/538
[58] Field of Search ................ 43/21.2, 27.4; 248/512, 248/514, 538

[56] References Cited

U.S. PATENT DOCUMENTS

| D. 219,971 | 2/1971 | Bennett | 43/21.2 |
|---|---|---|---|
| D. 239,015 | 3/1976 | Stout | 43/21.2 |
| 2,008,233 | 7/1935 | Walthers | 248/512 |
| 2,548,328 | 4/1951 | Thayer | 43/21.2 |
| 3,570,793 | 3/1971 | Shackel | 43/21.2 |
| 3,571,964 | 3/1971 | Bogathy | 43/21.2 |
| 4,650,146 | 3/1987 | Duke | 43/21.2 |
| 4,671,009 | 6/1987 | Faunce | 43/21.2 |

Primary Examiner—Kurt Rowan
Attorney, Agent, or Firm—Richard C. Litman

[57] ABSTRACT

A fishing pole and line holding device which allows one to troll from a multiple of positions around a boat includes a plurality of fishing pole holding means and means thereon to provide for extra fishing line. The angle of the holding means can be adjusted to a variety of positions and the device can be easily installed or removed by means of its base which includes a vertical adjustment capability.

2 Claims, 3 Drawing Sheets

U.S. Patent    Jun. 28, 1988    Sheet 2 of 3    4,753,029
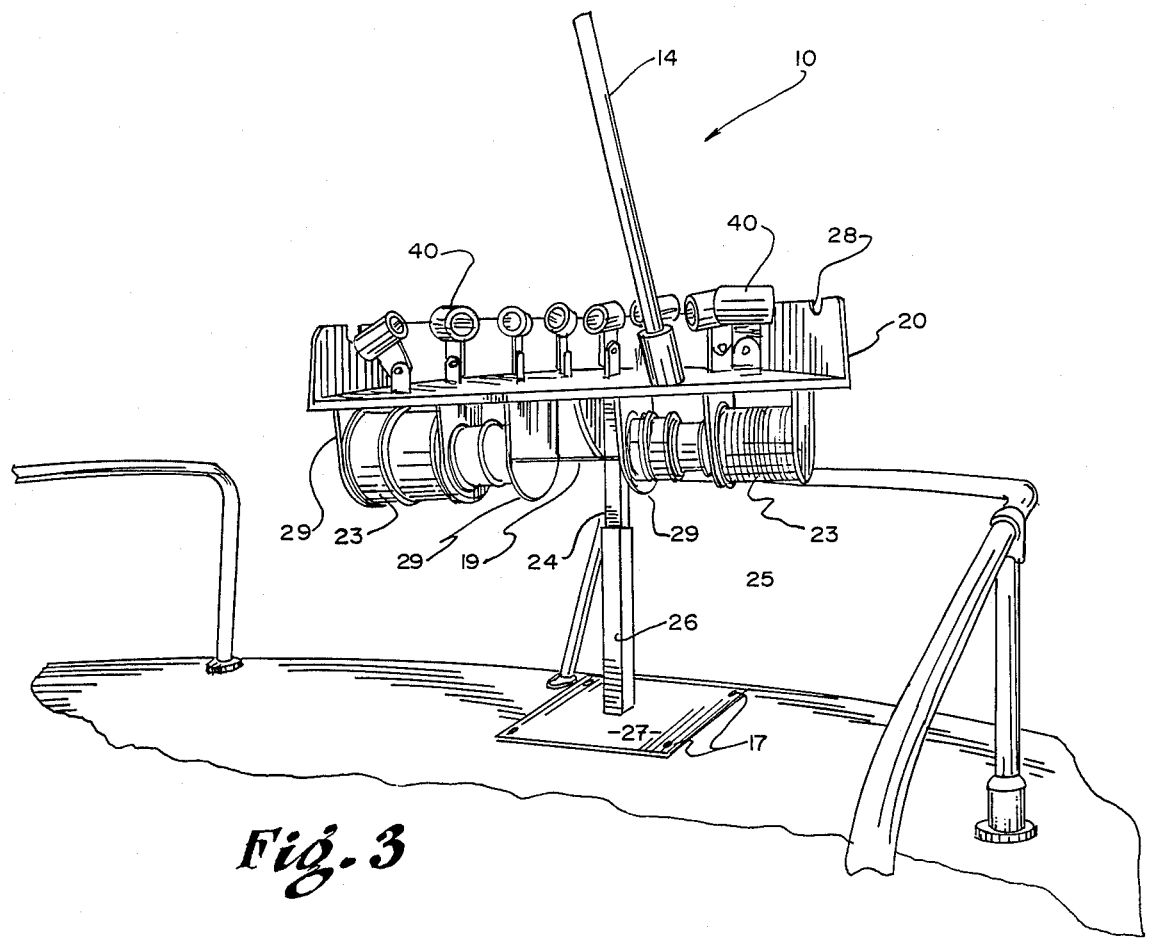
Fig. 3
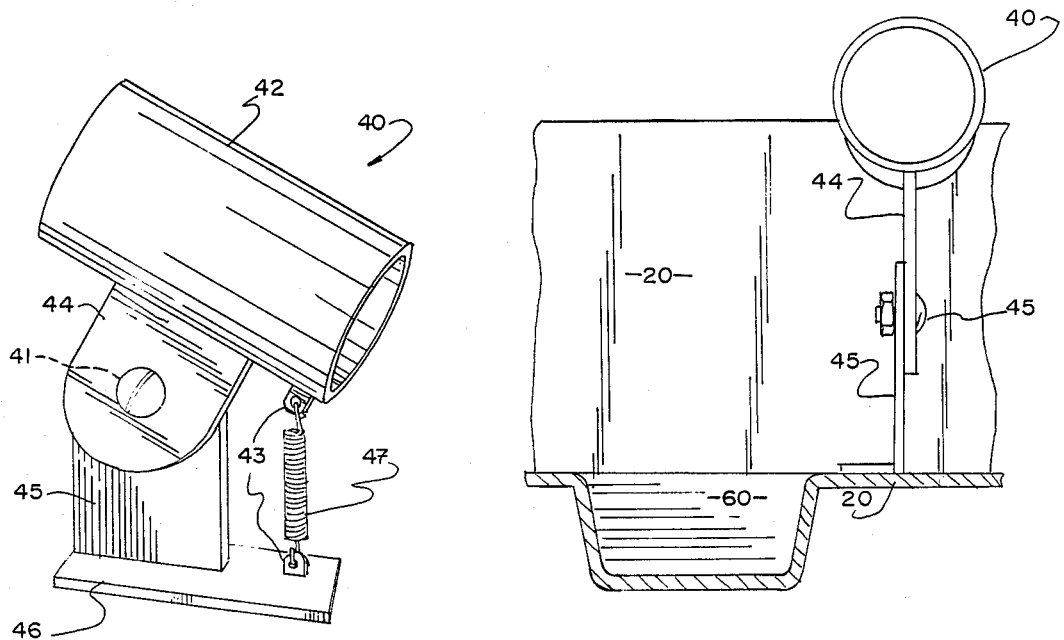
Fig. 5
Fig. 7

BOAT FISHING POLE AND LINE HOLDER

BACKGROUND OF THE INVENTION

1. Field of the Invention

The invention relates to a fishing pole and line holder that enables one to troll from the gunwale, the bow or the stern of a boat with a plurality of fishing poles at one time. The device is mounted on a movable base that allows one to troll from a multiple of positions around the boat and is easily removed or installed.

The invention can be used in conjunction with boats and fishing poles of a variety of designs. The method of construction of the invention is more fully described herein.

2. Description of the prior art

Various prior art fishing rod holding devices and the like, as well as their apparatuses and methods of construction in general, are known and are found to be exemplary of the U.S. prior art. They are:

| U.S. Pat. No. | Inventor |
| --- | --- |
| 2,479,055 | J. A. Baur |
| 3,802,112 | P. M. Banner |
| 4,157,803 | R. S. Mack |
| 4,388,774 | D. W. Thoemke |
| 4,527,349 | J. E. Emory, Jr. |

U.S. Pat. No. 2,479,055, issued to Baur, discloses a fishing rod holder. This is a fishing rod and reel holder that can be adjusted to hold the rod at the desired angle.

U.S. Pat. No. 3,802,112, issued to Banner, discloses a fishing rod holder pivotally connected to a base part having a means of securing the base part to different surfaces. The Banner patent further discloses a means of locking the fishing pole within the device.

U.S. Pat. No. 4,157,803, issued to Mack, discloses a fishing rod holder that is attached to the gun wale of a boat and includes a plurality of fishing rod holders that have a clamping means to help hold the rod in place.

U.S. Pat. No. 4,527,349, issued to Emory, discloses a trolling bar assembly consisting of a number of tubular rod holders that are secured to the boat by means of an elongated member. The reel part of this assembly is used for down riggers attached to the lines of the fishing poles.

These patents or known prior uses teach and disclose various types of fishing rod holders of sorts and of various manufactures, and the like, as well as methods of their construction; but none of them, whether taken singly or in combination, disclose the specific details of the combination of the invention in such a way as to bear upon the claims of the present invention.

SUMMARY OF THE INVENTION

An object, advantage, and feature of the invention is to provide a novel mechanism that is safe, simple and efficient in use and allows one to troll from a multiple of positions around a boat for the purpose of catching fish.

Another object of the invention is to provide a novel and improved construction whereby the device is capable of using multiple fishing poles and also incorporates extra fishing pole lines which are easily accessible.

These, together with other objects and advantages of the invention reside in the details of the process and operation thereof, as is more fully hereinafter described and claimed. References are made to drawings forming a part hereof, wherein like numerals refer to like parts throughout.

DESCRIPTION OF THE SEVERAL VIEWS OF THE INVENTION

FIG. 3 is a rear perspective view of the invention illustrating its construction and best mode of operation.

FIG. 5 is another enlarged perspective view of the fishing pole holder illustrating an alternate embodiment.

FIG. 7 is a cross-sectional view taken along lines 7—7 of FIG. 6.

DESCRIPTION OF THE PREFERRED EMBODIMENT

Figure 1:
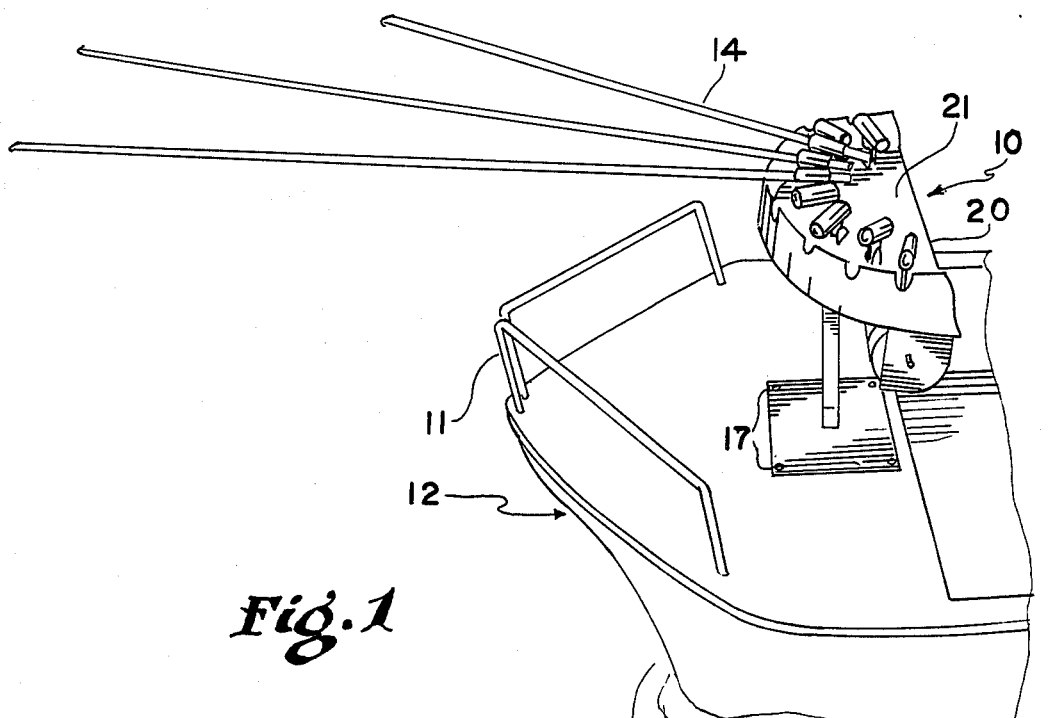
FIG. 1 is a front perspective view illustrating the concepts of the invention according to a preferred embodiment and best mode of operation.

Now referring to the figures, there is shown in FIG. 1 a fishing pole and line holder 10 that is mounted on either the gunwale, the bow or the stern of a boat 12 and enables a person to troll in a multiple of directions using a plurality of fishing poles 14.

Figure 2:
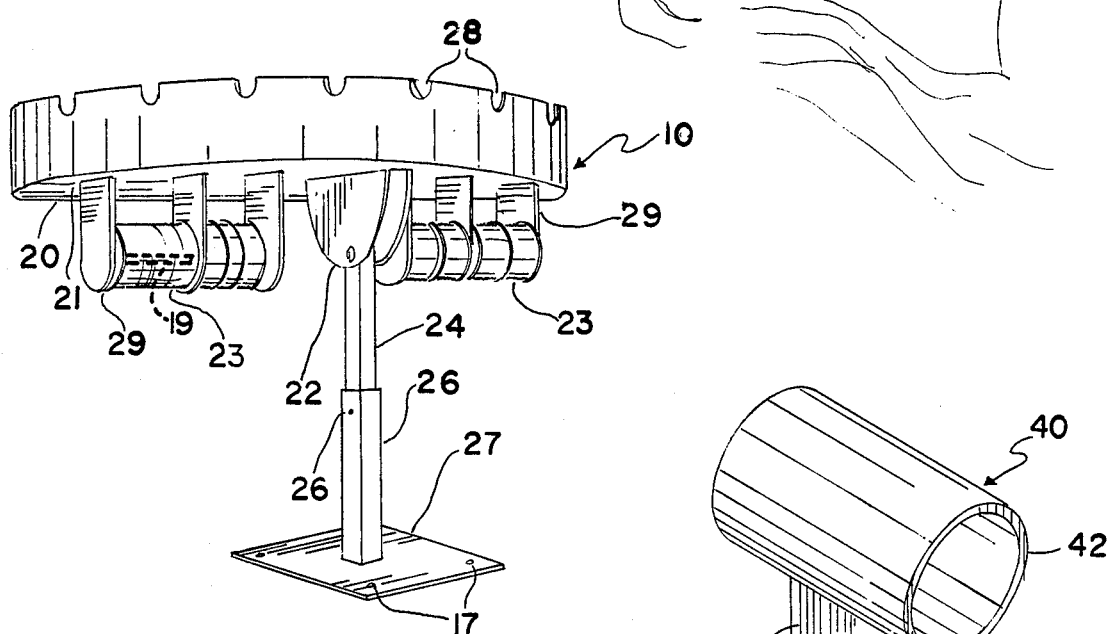
FIG. 2 is a front perspective view illustrating the construction of the invention.

As detailed in FIGS. 1, 2 and 3, the fishing pole and line holder 10 consists of a semi-circular horizontal frame member 20 to which is attached an upwardly extending semi-circular, vertical member 16 attached along the peripheral edge of the frame member 20. Mounted atop the upper surface 21 of the frame member 20 are a plurality of fishing pole holder elements 40 that are pivotally mounted to the frame member 20 as will be described hereinafter. Extending from the bottom surface 21' of the frame member 20 are a plurality of downwardly directed U-shaped supports 29 each having a bore disposed therein to receive a shaft 19 adapted to house a series of spools 23 containing extra fishing line. These spools 23 contain a line of a variety of sizes and strengths and are easily accessible to the user. Once a fish has been caught, the old line is removed or cut from the fishing pole 14 and a new one is pulled from the appropriate spool 23 and attached to the fishing pole 14.

As will be seen from FIG. 2, also disposed on the bottom surface of the frame member 20 is a U-shaped frame mount 22 serving to pivotally connect the device 10 to an elongated, rectangular frame support 24. The frame support 24 provides enough height for the frame member 20 to extend over the rail 11 of the boat 12 and fits telescopically into a vertical lower member 26 affixed to the desired boat structure such as by means of a base plate 27 which may be secured to either gunwale, the bow or to the stern by attaching the base plate 27 to the boat 12 using the screws 17 or a weld. A releasable fastener 22' allows tilting of the frame member while another fastener 26' cooperating with the telescopic members 24, 26 permits selective vertical adjustment of the apparatus.

Figure 4:
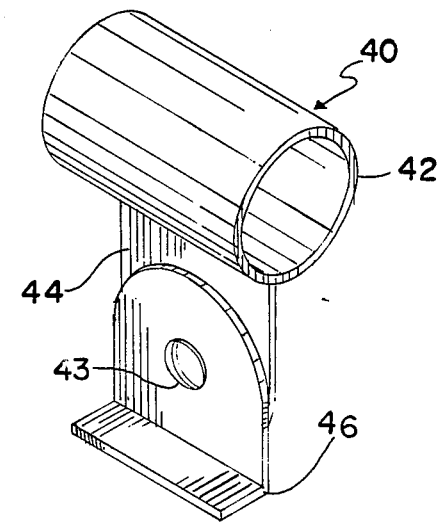
FIG. 4 is an enlarged perspective view of the fishing pole holder.

As shown in FIG. 1, the fishing poles 14 are secured in place using the fishing pole holders 40 attached to the top surface 21 of the frame member 20. The holders 40 may be designed as shown in FIG. 4 or as an alternate embodiment 40' illustrated in FIG. 5. Both holders include a tubular or cylindrical open-ended sleeve member 42 provided with a depending mount 44 having an opening 41 laterally aligned with an opening 43 in an upstanding base plate 45 having a foot or base 46. The latter is suitably affixed to the frame top surface 21 with the various holders 40 or 40' arranged in an arcuate manner so that when the sleeves 42 are substantially horizontal as in FIGS. 3 and 7, the axes therethrough extend through respective ones of the cut-outs or notches 28 formed in the vertical member 16.

The fishing pole holder 40' includes a resilient means such as a spring 47 that is attached via the spring mounts 43 to additionally maintain the holders 40' in place during movement and bending of the fishing poles 14 after a fish has been hooked. With the L-shaped brackets 46 either welded or bolted to the top surface of frame member 20, the hollow cylindrical portion 42 of the holders 40 and 40' allow a fishing pole 14 to be telescopically disposed therein. Once equipped with the fishing pole 14, the angle of the fishing pole holder 40 or 40' can be adjusted by loosening the fastener member 45, positioning the fishing pole 14 at the desired angle and resecuring the fastener 45. If desired, the holders 40 or 40' can be positioned such that the fishing poles 14 are allowed to rest in the U-shaped cavities 28 disposed along the top edge of the upwardly extending member 16.

Figure 6:
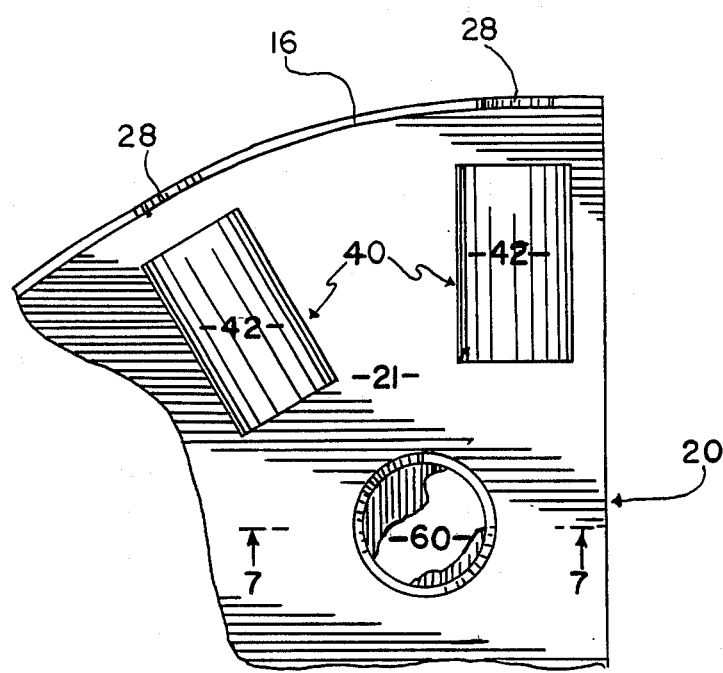
FIG. 6 is a top plan view illustrating elements of the invention.

Referring to FIGS. 6 and 7, as an alternate embodiment, the frame member 20 can also includes one or more refreshment holders 60 disposed therein with each designed so as to accommodate a variety of cups and bottles that are easily accessible to the user.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents which may be resorted to fall within the scope of the invention.

What is claimed is:

1. A fishing pole and line holder apparatus allowing one to troll from the gunwale, the bow or from the stern of a boat comprising:
   a frame member generally of semi-circular configuration and having a upwardly extending portion attached along its forward curved edge,
   said upwardly extending portion having a plurality of cavities disposed within its upper portion,
   a plurality of tubular, open-ended fishing pole holders mounded upon said frame member,
   said cavities vertically and angularly disposed relative said holders whereby a fishing pole telescopically disposed within any one holder rests within one said cavity when said holder and pole are substantially horizontal,
   a plurality of supports extending downwardly from said frame member,
   a frame mount attached to said frame member, a frame support pivotally connected to said frame mount, a base mount telescopically disposed within said frame mount to permit vertical adjustment of said frame member and holders, and
   fastening means securing said base mount to structure of a boat.

2. A fishing pole and line holder apparatus as set forth in claim 1 wherein said downwardly extending supports house a series of spools containing a fishing line.

* * * * *